United States Patent [19]
Ladouceur

[11] 3,922,770
[45] Dec. 2, 1975

[54] METHOD OF FORMING A PANEL ASSEMBLY

[75] Inventor: Harold A. Ladouceur, Livonia, Mich.

[73] Assignee: Multifastener Corporation, Detroit, Mich.

[22] Filed: Dec. 19, 1973

[21] Appl. No.: 426,277

Related U.S. Application Data

[60] Division of Ser. No. 353,049, April 20, 1973, which is a continuation-in-part of Ser. No. 149,517, June 3, 1971, abandoned.

[52] U.S. Cl. ................. 29/445; 29/512; 29/522; 151/41.73
[51] Int. Cl.² ............................................. B23P 9/00
[58] Field of Search ............ 29/445, 512, 522, 432, 29/509; 151/41.73, 41.72; 85/41

[56] References Cited
UNITED STATES PATENTS

| | | | |
|---|---|---|---|
| 2,004,182 | 6/1935 | Arey | 29/522 X |
| 2,379,804 | 7/1945 | Johnson | 151/41.73 X |
| 3,129,444 | 4/1964 | Kahn | 29/523 X |
| 3,193,857 | 7/1965 | Kahn | 29/523 X |
| 3,193,921 | 7/1965 | Kahn | 29/509 |
| 3,282,315 | 11/1966 | Zahodiakin | 29/509 X |
| 3,282,317 | 11/1966 | Zahodiakin | 29/522 X |

*Primary Examiner*—Charlie T. Moon
*Attorney, Agent, or Firm*—Cullen, Settle, Sloman & Cantor

[57] ABSTRACT

This disclosure relates to a method of forming a nut and panel assembly, wherein the nut is pierced into a nut chamber and the panel is threaded, prior to threading of the nut bore. The disclosed nut includes a circular chamber which receives the pierced portion of the panel for threaded engagement by a self-tapping screw or bolt and a coaxially aligned smooth cylindrical passage which receives the self-tapping screw.

17 Claims, 5 Drawing Figures

METHOD OF FORMING A PANEL ASSEMBLY

RELATED APPLICATIONS

This application is a division of my copending application for U.S. Pat., Ser. No. 353,049 filed Apr. 20, 1973, which is a continuation-in-part application of my application for U.S. Pat., Ser. No. 149,517, filed June 3, 1971, now abandoned.

FIELD OF THE INVENTION

The improved method of forming a panel of this invention is particularly suitable for securing a bolt or screw to a panel, or the like. The panel assembly includes an untapped nut, which is first secured to the panel, the panel and a self-tapping threaded member, such as a screw or bolt.

In the panel assemblies shown by the prior art, the screw or bolt is normally received through an aperture in the panel in a tapped opening in a nut or the like. Where a "self-tapping" screw is utilized, the nut may be affixed to the panel and the nut threads are thereafter formed by the screw. The driving torque of the self-tapping screw is however directly against the nut and may drive the nut off of the panel. In the panel assemblies shown by the prior art, the nut may be secured to the panel by deforming a portion of the panel into a nut cavity or chamber, however the assemblies disclosed by the prior art generally do not provide full engagement between the nut and panel around the panel aperture. In the panel assembly of this invention, the bolt or screw first threads into the panel, avoiding the forces tending to push the nut from the panel. Further, the bearing area between the panel and the nut is substantially increased, providing a three hundred sixty degree contact around the panel aperture.

The preferred embodiment of the nut disclosed herein includes an end portion adapted to be received against one face of the panel, a generally circular chamber opening through the end of the nut received against the panel and a coaxially aligned passage adapted to threadably receive a male threaded member such as a bolt or self-tapping screw. Upon receipt of the nut against the panel, the panel is pierced to provide a hole in registry with the nut chamber and deform the panel edges adjacent the pierced hole into the nut chamber.

Where a self-tapping screw is utilized in the assembly, the screw is then received through the panel aperture, opposite the nut, into threaded engagement with the panel portion received within the nut chamber, and then into threaded engagement with the wall defining the passage. The driving torque of the self-tapping screw is therefore directed first against the panel portion received within the nut chamber, rather than the nut, avoiding the push-off forces tending to drive the nut from the panel. Further, the nut provides full engagement with the panel adjacent the panel aperture.

The disclosed embodiment of the nut includes two coaxially aligned chamber portions; the first chamber portion adjacent the open end has a greater diameter than the second chamber portion, which communicates with the nut passage or aperture. The side wall of the first chamber portion is tapered radially outwardly from the open end of the chamber and terminates in a generally radial wall adjacent the second chamber portion, such that the pierced panel portion is retained in the first chamber portion.

The method of forming the nut and panel assembly described above then includes abutting the end face of the nut against the panel, piercing the panel in alignment with the nut bore with a piercing tool, or the like, which deflects portions of the panel axially within the area circumscribed by the chamber and radially outwardly into contact with the chamber walls, and defining a cylindrical bore coaxially aligned with the nut bore and of substantially the same inside diameter. The assembly is completed by threading a self-tapping screw or bolt in the pierced panel bore, forming a female thread in the panel bore and continuing to thread the screw into the nut bore, forming a continuous thread in the panel and nut bores.

Other advantages and meritorious features of the improved panel assembly of this invention will more fully appear from the following Description of the Preferred Embodiments, claims and drawings.

DESCRIPTION OF THE PREFERRED EMBODIMENT AND METHOD

Figure 1:
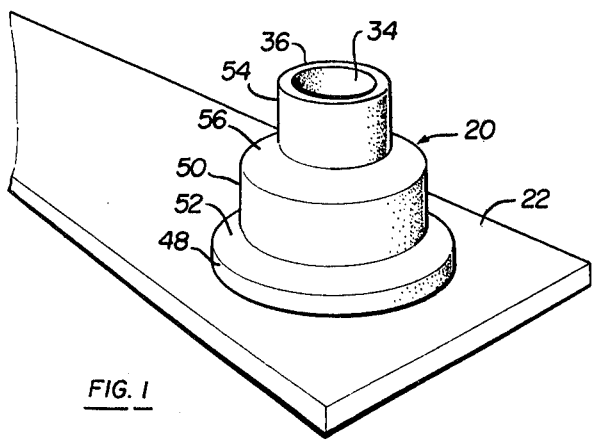
FIG. 1 is a perspective view of the panel assembly of this invention.
Figure 2:
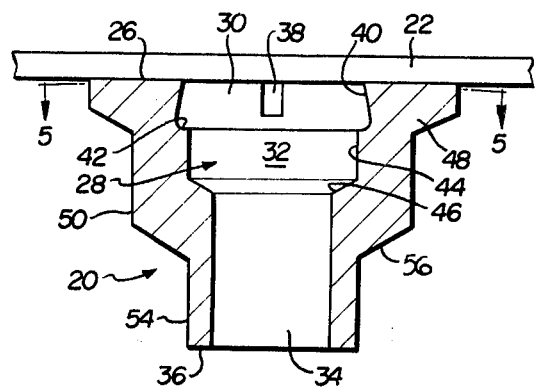
FIG. 2 is a side cross-sectional view of one embodiment of the nut received against a panel.
Figure 3:
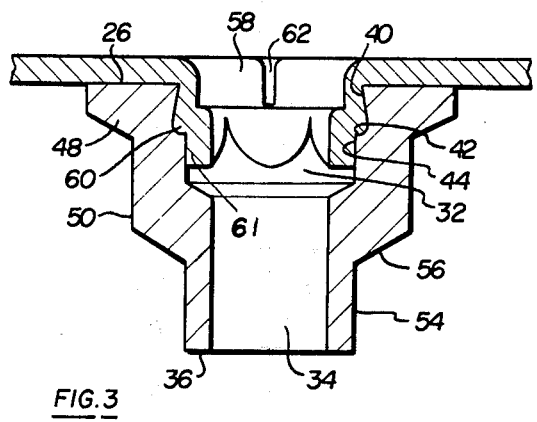
FIG. 3 is a side cross-sectional view of the embodiment of the nut shown in FIG. 2, after piercing of the panel.
Figure 4:
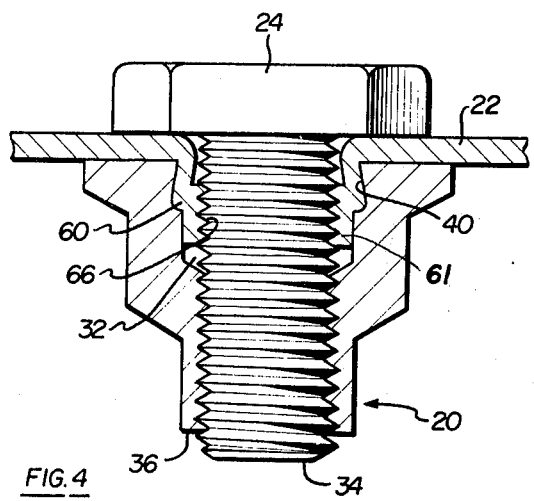
FIG. 4 is a side cross-sectional view of one embodiment of the panel assembly of this invention utilizing the nut shown in FIG. 1.
Figure 5:
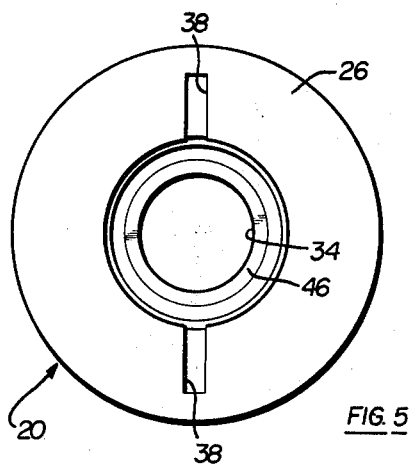
FIG. 5 is a top view of the nut shown in FIG. 2, in the direction of view arrows 5—5.

The panel assembly shown in FIGS. 1 to 5 includes a nut, generally indicated at 20, a panel 22 and a screw or bolt 24, as shown in FIG. 4. The disclosed embodiment of the nut includes a chamber 28 having an opening through end 26 to receive the pierced portion of the panel, as described hereinbelow. The nut chamber includes a first portion 30 adjacent the open end of the chamber and a second portion 32 which communicates with the coaxially aligned cylindrical passage 34 opening through the opposite end 36 of the nut. The passage 34 in the disclosed embodiment is not tapped, but threadably receives a "self-tapping" screw or other threaded fastener as described hereinbelow. A pair of radial slots 38 are also provided in the nut end 26 in the disclosed embodiment as shown in FIG. 3, to prevent relative rotation between the nut and panel.

The first chamber portion 30 in the disclosed embodiment of the nut is defined by a generally conical, radially outwardly tapered undercut wall 40 which lockingly receives the pierced portion of the panel and terminates a radial wall or stepped portion 42. The wall 44 of the second chamber portion 32 is generally cylindrical to receive the end of the pierced panel portion. The conical wall 46 joins the second chamber portion and the cylindrical passage 34.

The external configuration of the nut will depend upon the particular application. The disclosed embodiment of the nut includes a flanged portion 48 at the end 26 of the nut which is received against the panel 22. The nut body spaced from the panel includes a cylindrical portion 50, a tapered wall 52 joining the flanged portion and the cylindrical portion 50 and a cylindrical portion 54 at the opposed end 36 of the nut. A second tapered wall 56 joins the cylindrical portions 50 and 54.

The end 26 of the nut is received against the panel 22, as shown in FIG. 2, and supported for piercing or the like by a support, not shown. A cylindrical piercing tool, not shown, pierces a hole 58 in the panel in registry with the chamber 28 and deforms the pierced edges 60 of the panel into the first and second chamber portions, as shown in FIG. 3, locking the nut on the panel. The panel is also deformed by the piercing tool into the radial slots 38, as shown at 62, preventing rotation of the nut relative to the panel. In this embodiment, the panel is deformed outwardly against the tapered wall 44 of the first chamber portion 30 and against the step or radial wall 42, securely locking the nut on the panel.

Upon receipt of a self-tapping screw, or the like, as shown in FIG. 4, the threaded portion 64 of the screw is first received in the pierced panel portion 60, forming a plurality of threads 66 in the panel portion. Finally, the screw is received in the cylindrical passage 34, tapping the passage as shown in FIG. 4. It will be noted that the driving torque of the self-piercing screw first threads into the panel and therefore avoids the push-off forces until the screw is cutting. This feature substantially reduces the inadvertent pushing off of the nut, from the panel, during the assembly operation. Further, the disclosed embodiment of the nut provides full engagement between the nut and the panel at the pierced hole 58 in the panel, as shown at 26.

The method of making the panel assembly shown in FIG. 3 then includes engaging the panel 22 with the flanged end 26 of the nut. The flange 48 provides additional support for the nut. The panel is then pierced or punched, deforming the panel around the panel opening 58 into the nut chamber 28. The deformed panel edge includes a first portion 60 which is deformed against the undercut wall 40 of the nut chamber and a second cylindrical portion 61 closely conforming to the cylindrical wall 44 of the second cylindrical nut chamber 32. The first portion retains the nut in the nut chamber and the second cylindrical portion receives the self-tapping male threaded fastener, as described hereinbelow.

The cylindrical opening defined by the second panel portion 61 has an internal diameter substantially equal to and coaxially aligned with the cylindrical nut bore 34. The axial extent of the cylindrical panel portion is sufficient to receive a plurality of female threads, as described hereinbelow. The end of the panel edge is also preferably spaced from the opposed or confronting face 46 of the nut chamber to permit extrusion of the panel during threading, as described below. In the preferred embodiment, the panel is also deformed into the radial slots 62 to prevent rotation of the nut during threading and it will also be noted that the sharp edges formed by the piercing tool engage the cylindrical wall 32 of the chamber, also preventing relative rotation.

Finally, as shown in FIG. 4, a self-tapping screw or bolt is received in the panel opening 58, first threading the cylindrical portion 61 of the panel, then threading the nut bore 34 and finally drawing the panel and nut together. As described above, the axial extent of the cylindrical panel portion 61 preferably receives a plurality of full female threads 66, as shown in FIG. 4 which includes three or more threads. The panel edge is preferably spaced from the confronting wall 46 of the nut chamber to accommodate the panel as it is extruded during threading. The threading of the panel, prior to threading of the nut, prevents axial displacement of the nut under the torque of threading. The panel portion overlying the wall 40 also serves to guide the screw into the cylindrical panel opening 61 and prevent cross-threading. The axial bore 34 of the metal nut is then threaded, as shown in FIG. 4, forming a continuous female thread in the cylindrical portion 61 of the panel and the cylindrical bore 34 of the nut. Continued threading of the screw then draws the nut and panel tightly together, forming a secure panel assembly. In the preferred embodiment, the nut and panel are metal and the screw 24 includes self-tapping threads, to thread the nut and panel, as described above.

I claim:

1. In a method of forming a nut, bolt and panel assembly, said nut having a substantially flat end face, a recess opening onto said end face and a bore generally coaxially aligned and communicating with said recess, said nut bore having a smaller radius than the maximum radius of said recess, said panel being metal and having a predetermined thickness, including the steps of: abutting said end face of the nut against a face of the panel, piercing the panel in alignment with said nut bore from the face of the panel opposite said nut, extruding a portion of the panel axially into said nut recess, deforming said panel portion radially outwardly into contact with the nut recess wall to define an opening having an internal diameter generally equal to the internal diameter of said nut bore, and threading a self-tapping bolt into said panel opening and nut bore thereby forming a continuous thread with said panel and said nut bore.

2. The method defined in claim 1, wherein said nut includes a plurality of edges and said panel is deformed about said edges, during piercing, to prevent rotation of said nut, relative to said panel, upon threading of said bolt into said panel opening.

3. The method defined in claim 1, wherein said panel is pierced to define a plurality of edges extending towards said nut bore.

4. A method of forming a nut member and panel assembly, comprising a metal nut member having a chamber opening through one nut member face and an unthreaded cylindrical bore generally coaxially aligned and communicating with said chamber and opening through the opposite nut member face, said chamber having a greater internal diameter than said cylindrical bore, and a panel having a predetermined thickness, comprising the following steps, in sequence:
   a. abutting said one nut member face against a face of said panel;
   b. forming an integral tubular barrel portion from said panel within said nut member chamber with said barrel portion having an external face engaging the internal wall of said chamber and a generally cylindrical smooth internal wall coaxially aligned with an opening into said nut member bore, said internal barrel portion wall having substantially the same internal diameter as said nut member bore; and then,
   c. threading a female thread-forming member into said internal barrel portion wall, through said one nut member face thereby forming a female thread in said barrel portion and continuing threading said member into and through said nut member bore thereby forming a substantially continuous female thread in said panel barrel portion and said nut member bore.

5. The method defined in claim 4, wherein said panel is pierced and extruded into said nut member chamber thereby forming said tubular barrel portion prior to threading said nut member bore.

6. The method defined in claim 4, wherein said female threadforming member is a self-tapping bolt having a pitch diameter substantially equal to the internal diameters of said barrel portion and said nut member bore, including threading said self-tapping bolt into said panel barrel portion, through said one nut member face and then into and through said nut member bore.

7. The method defined in claim 4, including piercing and extruding said panel into said nut member chamber thereby forming a plurality of edges projecting into said bore to prevent relative rotation between said nut member and said panel during threading of said nut member.

8. The method defined in claim 4, wherein said nut member chamber includes a plurality of edges extending generally toward said bore, including piercing said panel and extruding said tubular barrel portion into said nut member chamber, forming a mechanical interlock between said nut chamber edges and said barrel portion prior to threading said barrel portion internal wall and said nut member bore.

9. The method defined in claim 8, wherein said chamber includes an annular wall inclined inwardly toward the axis of said chamber adjacent said one nut member face, including deforming said panel tubular barrel portion radially outwardly, beneath said annular wall, retaining the nut member on the panel during threading of said nut member tubular barrel portion.

10. The method defined in claim 4, wherein said nut member chamber includes a first portion adjacent said one nut member face and a second portion adjacent said bore, the major transverse dimension of said second chamber portion being substantially equal to the diameter of said nut bore plus twice the thickness of said panel and said first chamber portion having a greater transverse dimension, including forming said tubular panel barrel portion within said chamber portions and deforming said barrel portion radially outwardly into said larger first chamber portion and then threading said barrel portion cylindrical wall and said nut member wall, as defined.

11. The method defined in claim 10, wherein the internal diameter of said barrel portion located within said first chamber is greater than the internal diameter of said cylindrical wall located within said second chamber, providing a lead-in for said thread forming member, including disposing said thread forming member within said first chamber and then threading said cylindrical barrel portion within said second chamber portion.

12. A method of forming a nut and panel assembly, said nut having a chamber opening through one end and a cylindrical bore communicating with said nut chamber and opening through the opposite nut end, said chamber having a first portion adjacent said one nut end and a second portion adjacent said nut bore, the major transverse dimension of said second chamber portion being greater than the internal diameter of said nut bore and smaller than the major transverse dimension of said first chamber portion, comprising the following steps, in sequence:

piercing the panel in alignment with said nut bore and extruding a generally tubular portion of said panel into said nut chamber and radially deforming said panel portion outwardly to engage said chamber walls with said tubular portion having a internal diameter equal to said nut bore located within said second chamber and a greater internal diameter portion located within said first chamber portion, and then forming, in sequence, a female thread first in said panel tubular portion and then continuing to form a substantially continuous female thread into and through said bore, said greater diameter portion providing a lead-in in the forming of said female thread.

13. The method defined in claim 12, wherein said female thread is formed by a self-tapping bolt having a pitch diameter generally equal to the internal diameters of said cylindrical tubular panel portion and said nut bore, including threading said self-tapping bolt into said panel tubular portion and then into and through said nut bore.

14. The method defined in claim 12, wherein said first chamber portion of said tubular panel portion includes an annular wall inclined inwardly at the opening of said chamber, including deforming said tubular portion radially outwardly, beneath said annular wall, retaining the nut member on the panel.

15. In a method of forming a nut, bolt and panel assembly, said nut having a substantially flat end face, a recess opening onto said end face and a bore generally coaxially aligned and communicating with said recess, said nut bore having a smaller radius than the maximum radius of said recess, said panel being metal and having a predetermined thickness, including the steps of:

abutting said end face of the nut against a face of the panel, piercing the panel in alignment with said nut bore from the face of the panel opposite said nut, extruding a portion of the panel axially into said nut recess, deforming said panel portion radially outwardly (a) into contact with the nut recess wall to define an opening having an internal diameter generally equal to the internal diameter of said nut bore and (b) beneath a wall defining said recess to define a reentrant angle to the axis of said recess, preventing withdrawal of said panel portion from said nut recess, and threading a self-tapping bolt into said panel opening and nut bore thereby forming a continuous thread with said panel and said nut bore.

16. In a method of forming a nut and panel assembly, wherein the nut includes a smooth cylindrical bore and a larger coaxially aligned counterbore, the method comprising the following steps performed in sequence:

a. piercing the panel and displacing a panel portion into said nut counter-bore with the external face of said panel portion forming a mechanical interlock with the internal face of said counter-bore and the internal radius of said displaced panel portion being generally equal to the internal radius of said nut bore, then b. threading the internal face of said displaced panel portion and finally threading said nut bore, thereby forming a substantially continuous female thread in said panel portion and said nut bore.

17. In a method of forming a nut and panel assembly, wherein said nut includes a smooth cylindrical bore through one nut end and a coaxially aligned nut chamber having a greater transverse dimension then the diameter of said nut bore and said chamber opening through the opposite nut end, said chamber opening into said nut bore and defining a wall opposed to said opposite nut end, the method comprising the steps of:
 a. supporting said opposite nut end against one face of the panel,
 b. piercing said panel and displacing a panel portion into said nut chamber and radially outwardly into engagement with the chamber internal wall in a continuous stroke of the piercing tool, the pierced edge of said panel portion being spaced from said opposed chamber wall and the internal face of said panel portion having a diameter generally equal to the diameter of said nut bore, then
 c. threading said internal face of said panel portion and simultaneously extruding said panel portion toward said chamber wall and finally threading said nut bore, thereby forming a substantially continuous female thread in said panel portion and said nut bore.

* * * * *